(12) United States Patent
Tymus et al.

(10) Patent No.: US 10,330,024 B2
(45) Date of Patent: Jun. 25, 2019

(54) UNIVERSAL EXTERNAL ISOLATION AND B AND B VALVE SKID FOR INDUSTRIAL GAS APPLIANCES

(71) Applicant: General Electric Company, Schenectady, NY (US)

(72) Inventors: Shahriar Tymus, Humble, TX (US); Randall John Kleen, Channelview, TX (US); Tho Vankhanh Nguyen, Cypress, TX (US); Harley Matthew Ross, Pearland, TX (US); John Thanh Nguyen, Houston, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 566 days.

(21) Appl. No.: 14/989,597

(22) Filed: Jan. 6, 2016

(65) Prior Publication Data
US 2017/0191579 A1    Jul. 6, 2017

(51) Int. Cl.
| | |
|---|---|
| *F02C 9/42* | (2006.01) |
| *F02M 65/00* | (2006.01) |
| *F02C 7/232* | (2006.01) |
| *F16K 37/00* | (2006.01) |
| *G05D 7/06* | (2006.01) |
| *F16K 27/00* | (2006.01) |
| *F02C 3/04* | (2006.01) |
| *F01D 15/10* | (2006.01) |
| *F02B 63/04* | (2006.01) |
| *F02C 9/26* | (2006.01) |
| *F02C 9/18* | (2006.01) |
| *F02M 61/04* | (2006.01) |
| *G05D 16/20* | (2006.01) |

(52) U.S. Cl.
CPC ............. *F02C 9/42* (2013.01); *F01D 15/10* (2013.01); *F02B 63/04* (2013.01); *F02C 3/04* (2013.01); *F02C 7/232* (2013.01); *F02C 9/18* (2013.01); *F02C 9/26* (2013.01); *F02M 61/04* (2013.01); *F02M 65/006* (2013.01); *F16K 27/00* (2013.01); *F16K 37/0091* (2013.01); *G05D 7/0647* (2013.01); *G05D 16/2093* (2013.01); *F05D 2220/32* (2013.01); *Y10T 137/8326* (2015.04); *Y10T 137/87925* (2015.04)

(58) Field of Classification Search
CPC .... F02C 7/232; F02C 9/42; F02C 9/18; F02C 9/26; F02C 3/04; Y10T 137/87925; Y10T 137/8326; G05D 16/2093; G05D 7/0647; F16K 37/0091; F02M 61/04; F02M 65/006; F02B 63/04; F01D 15/10; F05D 2220/32

See application file for complete search history.

(56) References Cited

U.S. PATENT DOCUMENTS

| | | | | |
|---|---|---|---|---|
| 2,653,446 A | * | 9/1953 | Price | F02C 3/06 |
| | | | | 415/115 |
| 5,827,950 A | * | 10/1998 | Woodbury | F23N 5/242 |
| | | | | 73/40.5 R |

(Continued)

*Primary Examiner* — Atif H Chaudry
(74) *Attorney, Agent, or Firm* — Fletcher Yoder, P.C.

(57) ABSTRACT

A system includes a pre-assembled, modular valve assembly configured to be coupled to both an industrial gas appliance and a fuel supply system for the industrial gas appliance. The system includes a manual isolation valve, a first block valve, and a bleed valve. The modular valve assembly is configured to be disposed at a location separate from the industrial gas appliance.

20 Claims, 6 Drawing Sheets

(56) References Cited

U.S. PATENT DOCUMENTS

| | | | | |
|---|---|---|---|---|
| 6,434,940 B1* | 8/2002 | Araujo | ............... | F02B 33/34 |
| | | | | 123/565 |
| 6,953,045 B2* | 10/2005 | Enerson | ............... | F17C 5/06 |
| | | | | 137/14 |
| 8,951,019 B2 | 2/2015 | Hains et al. | | |
| 2012/0240591 A1* | 9/2012 | Snider | ............... | F01K 23/101 |
| | | | | 60/772 |
| 2015/0333519 A1* | 11/2015 | Shiota | ............... | H02J 3/46 |
| | | | | 307/44 |

* cited by examiner

UNIVERSAL EXTERNAL ISOLATION AND B AND B VALVE SKID FOR INDUSTRIAL GAS APPLIANCES

BACKGROUND

The subject matter disclosed herein relates to a supporting skid system, such as a skid system to support a gas appliance package.

Gas appliance packages are used in many industrial operations. The gas appliance packages often work with supporting equipment at a customer site. The supporting equipment may be supplied to the customer in a disjointed manner so that the customer has to assemble the supporting equipment at the customer site. Often times, errors occur when the supporting equipment is assembled. These errors may lead to downtime of the gas appliance package installation that may result in lost revenue or compliance issues.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a system includes a pre-assembled, modular valve assembly configured to be coupled to both an industrial gas appliance and a fuel supply system for the industrial gas appliance. The system may include a manual isolation valve, a first block valve, and a bleed valve. The modular valve assembly may be configured to be disposed at a location separate from the industrial gas appliance.

In a second embodiment, a system includes a universal skid assembly configured to be utilized with different industrial gas appliances. The universal skid assembly includes a modular valve assembly includes a manual isolation valve, a first block valve, and a bleed valve.

In a third embodiment, a system includes a pre-assembled, modular valve assembly configured to be coupled to both an industrial gas appliance and a fuel supply system for the industrial gas appliance. The pre-assembled, modular valve assembly includes a manual isolation valve, a first block valve, and a bleed valve. The modular valve assembly is configured operate within a range of different operating pressures to enable operation with the different industrial gas appliances.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
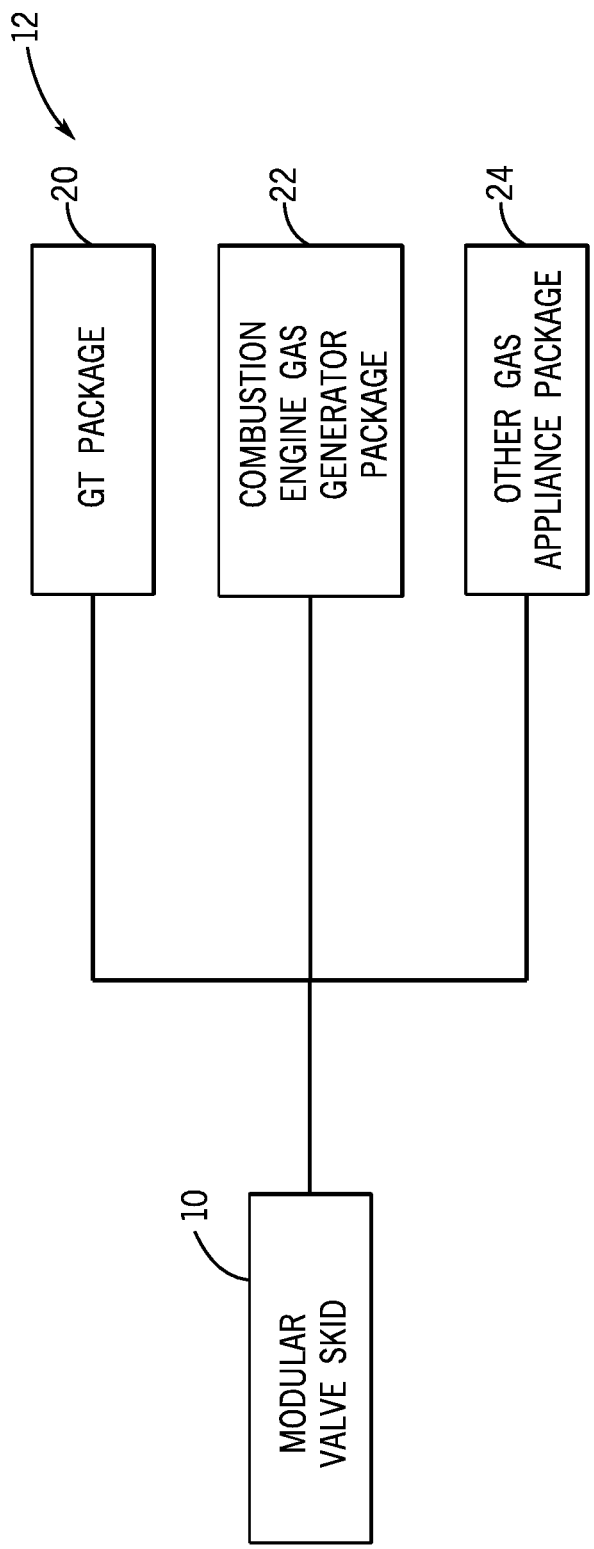
FIG. 1 depicts a block diagram of a variety of gas appliance packages that may be coupled to a valve skid assembly.

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

A supporting skid system for supporting a gas appliance package through utilization of a pre-assembled modular skid assembly is described in detail below. The pre-assembled modular skid assembly is coupled to a fluid flow conduit (e.g., pipeline) on a first end and to a gas appliance package on a second end. The pre-assembled modular skid assembly includes at least a manual isolation valve, a shut off valve, and a bleed valve (e.g., vent valve). These valves may be utilized in the valve leak test (e.g., bottle test) to indicate whether or not there is fluid leaking from the flow conduit. Once assembled, the modular skid assembly may provide cost savings due to ease of servicing the components of the modular skid assembly (e.g., through flanged components). As discussed in detail below, the embodiments of the pre-assembled modular valve skid assembly include several benefits related to the distance at which the pre-assembled, modular valve skid assembly is located from the gas appliance package. The pre-assembled modular valve skid assembly may be located approximately 1.5 to 6 meters, 2 to 5 meters, 2.5 to 3.5 meters from the gas appliance package, and all subranges therebetween. The distance of the modular valve skid assembly may prevent area class interferences from occurring between surrounding skids. The distance of the modular valve skid assembly may also encourage reduction of waste gas by reducing the amount of trapped gas that remains in the fluid flow conduit (e.g., piping, fuel supply system). By positioning the modular valve skid assembly at an appropriate distance away from the gas appliance package, the amount of waste gas can be maintained at an appropriate level. By increasing the fluid flow conduit (e.g., piping, fuel supply system) the amount of waste gas may increase to levels that are unacceptable for safety standards, environmental standards, or other concerns. The location of the modular valve skid assembly may also contribute to reduction of trapped fluid flow (e.g., gas, fuel) in the fluid flow conduit (e.g., piping, fuel supply system). For example, positioning the modular valve skid assembly too far away from the gas appliance package may cause excess fluid volume (e.g., gas, fuel) to remain in the fluid flow conduit (e.g., piping) which may result in reaching a lower explosive limit (LEL) during venting. Moreover, positioning the modular valve skid assembly too far away may increase the amount of time to vent the gas during shutdown takes because of the distance from one end of the fluid flow conduit (e.g., coupled to the valve skid assembly) to an opposite end of the fluid flow conduit (e.g., coupled to the gas appliance package).

Turning now to the figures, FIG. 1 depicts a block diagram of a variety of gas appliance packages 12 that may be coupled to a valve skid assembly 10. As described above, a goal of the pre-assembled, modular valve skid assembly 10 is to enable improved operation (e.g., start up, shutdown) of the valve skid assembly in industrial operations by reducing the inefficiencies created by manually configuring a valve skid assembly. The improved operation of the valve skid assembly 10 is realized through reduction of human error when manually configuring a valve skid assembly, reduction in time to start operations, and reduction in associated man hours and labor costs.

As depicted, the pre-assembled, modular valve skid assembly 10 may be coupled to a variety of gas appliance packages. For example, the pre-assembled, modular valve skid assembly 10 may be coupled to a gas turbine generator package 20, a combustion engine generator package 22, any suitable gas appliance package 24 (e.g., a diesel engine), or any combination thereof. The pre-assembled, modular valve skid assembly 10 may be configured to tie into the suitable gas appliance package by a fluid (e.g., fuel) flow conduit. The arrangement of the pre-assembled, modular valve skid assembly 10 enables certain benefits compared to manually assembling a valve assembly from parts which are shipped loose to a customer site. For example, the arrangement of the pre-assembled, modular valve skid assembly 10 may provide numerous benefits, including avoidance of class area interference. For example, the arrangement of the pre-assembled, modular valve skid assembly 10 may be positioned at a distance away from certain classes of materials (e.g., Class I materials) where dispersion of these materials is less likely due to the position of the pre-assembled, modular valve skid assembly 10 at an appropriate location based on site specifics.

In the illustrated embodiment, the pre-assembled, modular valve skid assembly 10 may include various flange connections. The flange connections may provide easier access to the service the components of the modular valve skid assembly 10. For example, flanged components (e.g., vent valve) of the pre-assembled, modular valve skid assembly 10 may enable these components to be taken out of service more easily to repair, replace, or otherwise service the flanged component. These flanged components may reduce the amount of down time necessary to service the component. As such, the flanged component can be removed entirely while it is being serviced (e.g., repaired, replaced) while a substitute component is disposed in its place in the pre-assembled, modular valve skid assembly 10 (e.g., a universal skid assembly). Ease of accessing the flanged component can thereby reduce the amount of time the gas appliance package and the associated pre-assembled, modular valve skid assembly 10 are shutdown.

The location of the modular valve skid assembly 10 may also encourage reduction of waste gas by reducing the amount of trapped gas that remains in the fluid flow conduit (e.g., piping, fuel supply system). By positioning the modular valve skid assembly 10 at an appropriate distance away from the gas appliance package, the amount of waste gas can be maintained at an appropriate level. By increasing the distance of the fluid flow conduit (e.g., piping, fuel supply system) to the gas appliance package, the amount of waste gas may increase to levels that are unacceptable for safety, environmental, or other concerns. The location of the modular valve skid assembly 10 may also contribute to reduction of trapped fluid flow (e.g., gas, fuel) in the fluid flow conduit (e.g., piping, fuel supply system). For example, positioning the modular valve skid assembly 10 too far away from the gas appliance package may cause excess fluid volume (e.g., gas, fuel) to remain in the fluid flow conduit (e.g., piping, fuel supply system) which may result in reaching a lower explosive limit (LEL) during venting the gas (e.g., during shutdown). Moreover, positioning the modular valve skid assembly 10 too far away may increase the amount of time the shutdown takes because of the distance from one end of the fluid flow conduit (e.g., coupled to the valve skid assembly 10) to an opposite end of the fluid flow conduit (e.g., coupled to the gas appliance package).

Figure 2:
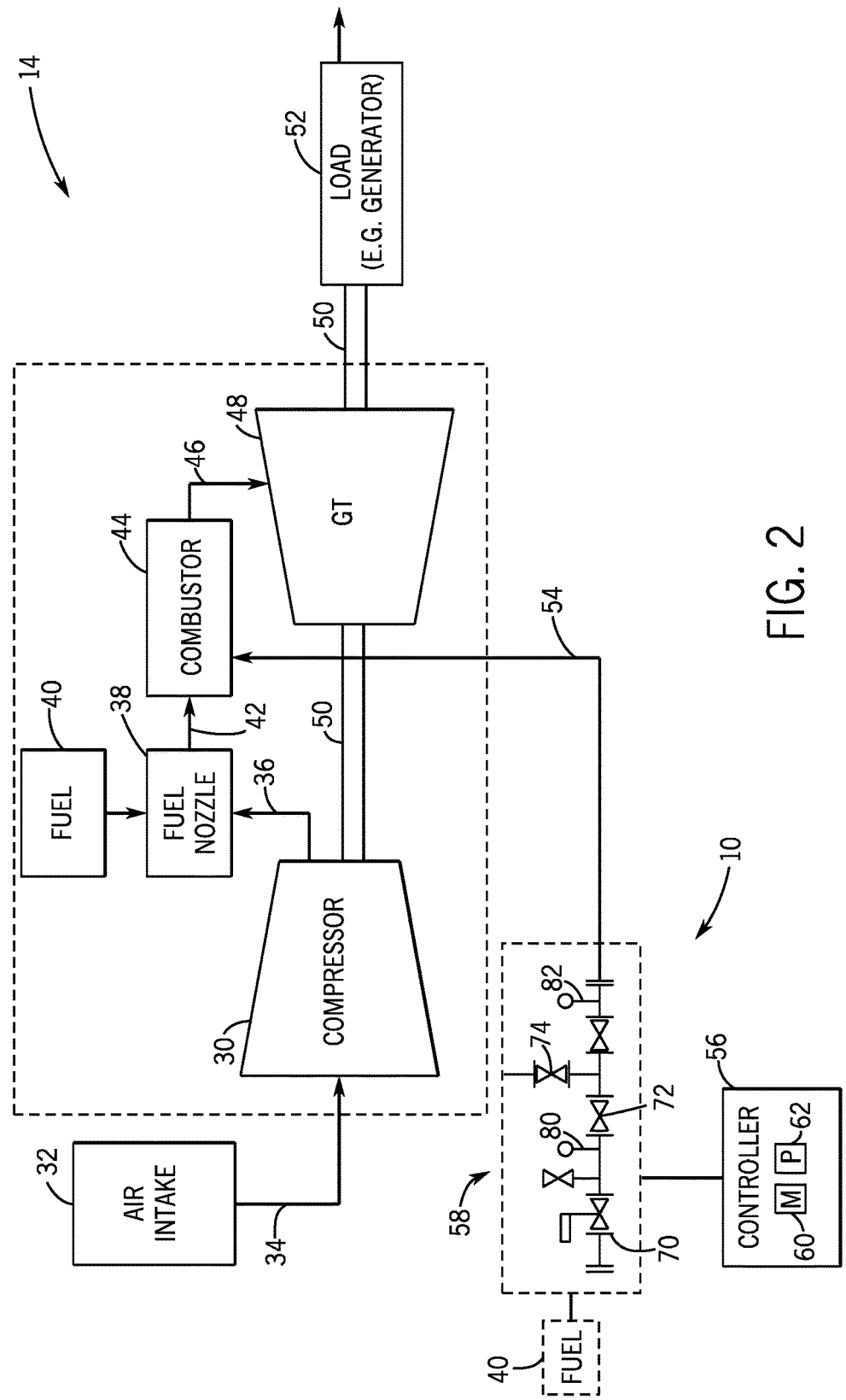
FIG. 2 depicts an embodiment of a valve skid assembly of FIG. 1 coupled to a gas turbine engine.

Certain aspects of the pre-assembled, modular valve skid assembly 10 may be controlled by a controller 56 as described further with respect to FIG. 2. FIG. 2 depicts an embodiment of the valve skid assembly 10 coupled to a gas appliance package 24 (e.g., a gas turbine engine 14). The compressor 30 intakes ambient air to the gas turbine engine 14 via an air intake 32. The ambient air is taken in by the air intake 32 into the gas turbine system 14 via a suitable mechanism, such as a cold air intake, for subsequent delivery of an inlet air 34 into the compressor 30. As discussed herein, the inlet air 34 may be an oxidant including, but not limited, to the ambient air, oxygen, oxygen-enriched air, recirculated exhaust gas, or any combination thereof. The compressor 30 compresses the inlet air 34, forming pressurized air 36 by rotating blades within the compressor 30. When the compressor 30 compresses the inlet air 34, the compressor adds energy to the inlet air 34, thereby increasing the pressure and the temperature such that the pressurized air 36 is warmer and at a higher pressure than the ambient air. The pressurized air 36 may be discharged into one or more fuel nozzles 38, which mix the pressurized air 36 and a fuel 40 (e.g., a liquid fuel and/or gas fuel, such as natural gas) to produce an air-fuel mixture 42 suitable for combustion.

As depicted, the pressurized air 36 enters a fuel nozzle 38 and mixes with fuel 40. The fuel nozzle 38 directs the air fuel mixture 42 into a combustor 44. The combustor 44 ignites and combusts the air-fuel mixture 42, to form combustion products 46. The combustion products 46 are directed to a gas turbine 48, where the combustion products 46 expand and drive blades of the gas turbine 48 about a shaft 50. The gas turbine 48 is coupled to the compressor 30 and drives the compressor 30 by a common shaft 50. In an alternative embodiment, the fuel 40 may enter the valves 58 and may flow through the fluid flow conduit 54. The gas turbine 48 may also drive a load 52 via the common shaft 50. Compressor vanes or blades are included as components of a compressor 30. Blades within the compressor 30 are coupled to the shaft 50, which is driven by the gas turbine 48. The common shaft 50 may be coupled to several components (e.g., compressor 30, gas turbine 48, load 52) throughout the gas turbine system 14. As will be appreciated, the load 52 may include an electrical generator, a compressor, a pump or mechanical load, and so forth.

The combustor 44 receives a fluid flow (e.g., fuel) from a fluid flow conduit 54 as depicted. The fluid flow conduit 54 couples the pre-assembled, modular valve skid assembly 10 to any suitable gas appliance package to support the gas turbine engine 14. It will be appreciated that the modular valve skid assembly 10 may support other equipment (e.g., a gas turbine generator package 20, a combustion engine generator package 22, any suitable gas appliance package 24), as described herein. Accordingly, the embodiments of the valve skid assembly 10 are not intended to be limited to those described herein.

The pre-assembled, modular valve skid assembly 10 is configured to operate with a range of different operating pressures. For example, different industrial gas appliances (e.g., gas turbine engine 14, combustion engine 16, generator 18, gas turbine generator package 20, combustion engine generator package 22, suitable gas appliance package 24, or any combination thereof), as the different industrial gas appliance package may operate at different pressures. In some embodiments, the pre-assembled, modular valve skid assembly 10 is configured to operate between 6.9 to 10,342 kPa, 3,447 to 6,894 kPa, 4,000 to 5,000 kPa, and all subranges therebetween.

As described above, the distance at which the pre-assembled, modular valve skid assembly 10 is located from the gas appliance package 24 (e.g., gas turbine engine 14) improves class area interference in the illustrated embodiment. The distance at which the pre-assembled, modular valve skid assembly 10 is located from the gas appliance package 24 may vary from approximately 1.5 to 6 meters, 2 to 5 meters, 2.5 to 3.5 meters, and all subranges therebetween.

The controller 56 coupled to the pre-assembled, modular valve skid assembly 10 is configured to receive a signal from the one or more sensors. The controller 56 may be configured to open and close valves 58 of the pre-assembled, modular valve skid assembly 10 to control the flow of the fluid (e.g., fuel) through the fluid conduit 54 (e.g., fuel supply system). In certain embodiments, the controller 56 may utilize a memory 60 (e.g., machine-readable medium) to store instructions (e.g., code) and a processor 62 (e.g., multiple microprocessors, one or more "general-purpose" microprocessors, one or more special-purpose microprocessors, and/or other processor configuration) to execute the instructions. In some embodiments, the controller 56 may determine via instructions stored in the memory 60 the desired flow rate of the fluid based at least in part on a desired operating parameter of the gas turbine engine 14. In some embodiments, the controller 56 may determine via instructions stored in the memory 60 the desired pressure of the fluid (e.g., fuel) to the gas turbine engine 14 or other gas appliance package. In some embodiments, the controller 56 is configured to control the flow of the fluid (e.g., fuel) to the gas turbine engine 14 or other gas appliance package. For example, the controller 56 may be configured to process various instructions stored in the memory 60 to respond to various operating conditions (e.g., start up, shutdown, emergency shutdown) as described further with respect to FIGS. 4-6.

In the illustrated embodiment, the modular valve skid assembly 10 includes a plurality of valves 58 of the valve assembly. For example, the valve assembly can include one or more valves 58 of the same or different type. For example, the valve assembly can include one or more gate valves, butterfly valves, globe valves, ball valves, check valves, or other valve types. Moreover, the one or more valve assemblies may include combinations of valves. As described above, the valve assembly may be configured to adjust the total volumetric flow of fluid to the gas appliance package 24.

In the illustrated embodiment, the modular valve skid assembly 10 may minimally include a manual isolation valve 70, a shut off valve 72 (e.g., block valve), and bleed valve 74 (e.g., vent valve). The manual isolation valve 70 may serve as a redundancy in the system to provide further isolation features in addition to the shut off valve 72 and the bleed valve 74. The controller 56 may be configured to operate the shut off valve 72 (e.g., block valve), and the bleed valve 74 (e.g., vent valve) differently based at least in part on the state of operation of the gas appliance package. Though the illustrated embodiment depicts the valve skid assembly 10 as shown, it should be appreciated that the valves 58 may otherwise include other configurations to be utilized in the pre-assembled modular valve skid assembly 10. The valves 58 are assembled on a skid such that the modular valve skid assembly 10 may be transported to a site location which a customer may then use with an appropriate gas appliance package.

The illustrated embodiment also includes a first pressure transducer 80 configured to monitor a gas pressure for startup of the industrial gas appliance, and a second pressure transducer 82 configured to be utilized in a gas leakage test external to the industrial gas appliance. The first and second pressure transducers 80, 82 may be configured to take pressure readings of the fluid flow conduit (e.g., pipeline, fuel supply system). For example, an initial pressure reading is taken with the valves 58 to determine if the pressure has changed within the fluid flow conduit, while the shut off valve 72 (e.g., block valve) is closed. Next, the shut off valve 72 (e.g., block valve) are closed, and the bleed valve 74 is opened and a predetermined amount of time (e.g., 5 seconds, 15 seconds, 20 seconds) is allowed to pass. Then the first and second pressure transducers 80, 82 are utilized to measure the pressure of the fluid flow conduit again. If the pressure of the fluid flow conduit has risen or decreased, the valve leak test (e.g., bottle test) indicates there fluid flow conduit is leaking. Accordingly, the controller 56 may then identify the valves 58 which are leaking so that these valves can be repaired, replaced, or otherwise service. It will be appreciated that the modular valve skid assembly 10 may include greater or fewer components than shown in the illustrated embodiment. For example, additional equipment utilized in the modular valve skid assembly 10 may include additional valves (e.g., isolation valves, shut off valves, bleed valves, automatic fast acting shut off valves, flow control valves), a strainer, a combustion system, and so forth. Alternatively, the modular valve skid assembly 10 may be configured to operate with less equipment than depicted as described further with respect to FIG. 3.

Figure 3:
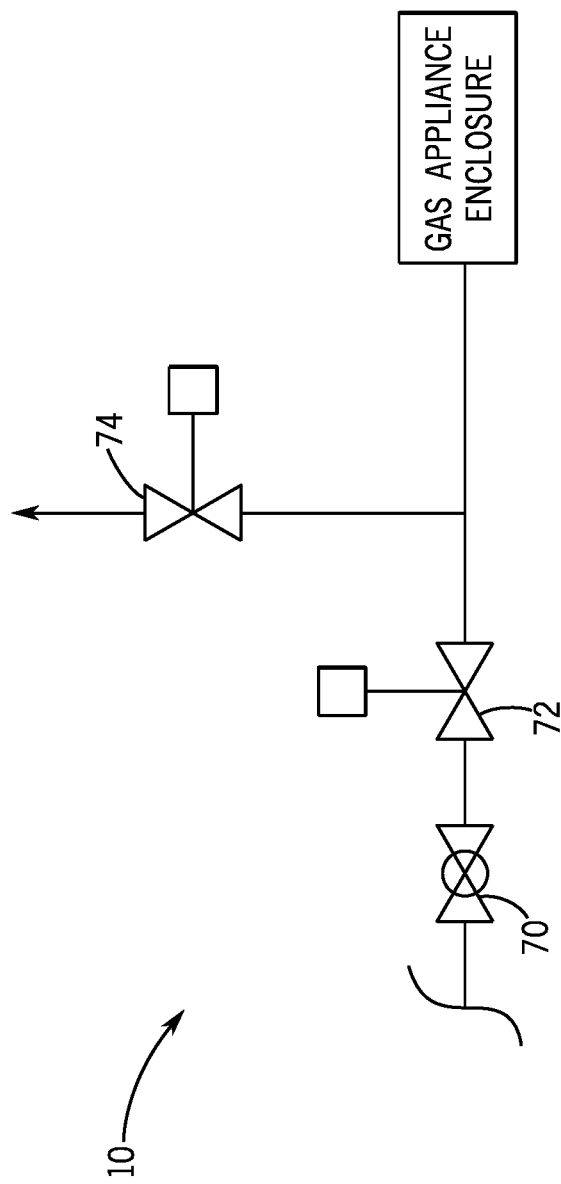
FIG. 3 depicts an embodiment of the valve skid assembly of FIGS. 1-2.

FIG. 3 depicts an embodiment of the valve skid assembly 10 of FIG. 1. In this embodiment, the modular valve skid assembly 10 includes the manual isolation valve 70, the shut off valve 72, and the bleed valve 74 (e.g., vent valve). As described above, the valves 58 are utilized may be utilized in the valve leak test (e.g., bottle test) to indicate whether or not there is fluid leaking from the flow conduit.

The distance at which the pre-assembled, modular valve skid assembly 10 is located from the gas appliance package 24 may vary from approximately 1.5 to 6 meters, 2 to 5 meters, 2.5 to 3.5 meters, and all subranges therebetween. The distance of the modular valve skid assembly 10 may also encourage reduction of waste gas by reducing the amount of trapped gas that remains in the fluid flow conduit (e.g., piping). By positioning the modular valve skid assembly 10 at an appropriate distance away from the gas appliance package, the amount of waste gas can be maintained at an appropriate level. By increasing the fluid flow conduit (e.g., piping) the amount of waste gas may increase to levels that are unacceptable for safety, environmental, or other concerns. The location of the modular valve skid assembly 10 may also contribute to reduction of trapped fluid flow (e.g., gas, fuel) in the fluid flow conduit (e.g., piping). For example, positioning the modular valve skid assembly 10 too far away from the gas appliance package may cause excess fluid flow (e.g., gas, fuel) to remain in the fluid flow conduit (e.g., piping) which may result in reaching a lower explosive limit (LEL). Moreover, positioning the modular valve skid assembly 10 too far away may increase the amount of time the shutdown takes because of the distance from one end of the fluid flow conduit (e.g., coupled to the valve skid assembly 10) to an opposite end of the fluid flow conduit (e.g., coupled to the gas appliance package).

Figure 4:
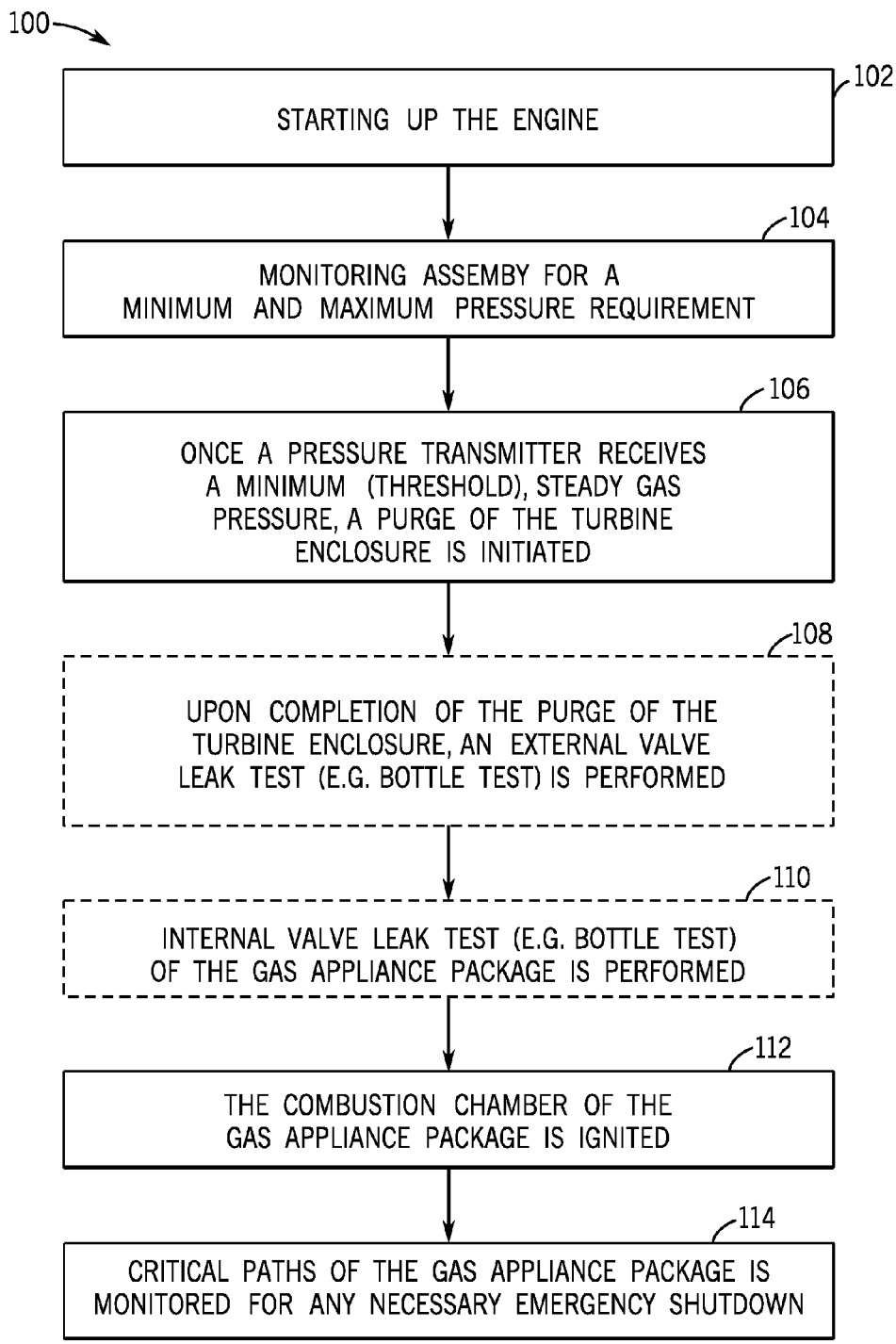
FIG. 4 depicts a method of controlling the valve skid assembly during normal operation.
Figure 5:
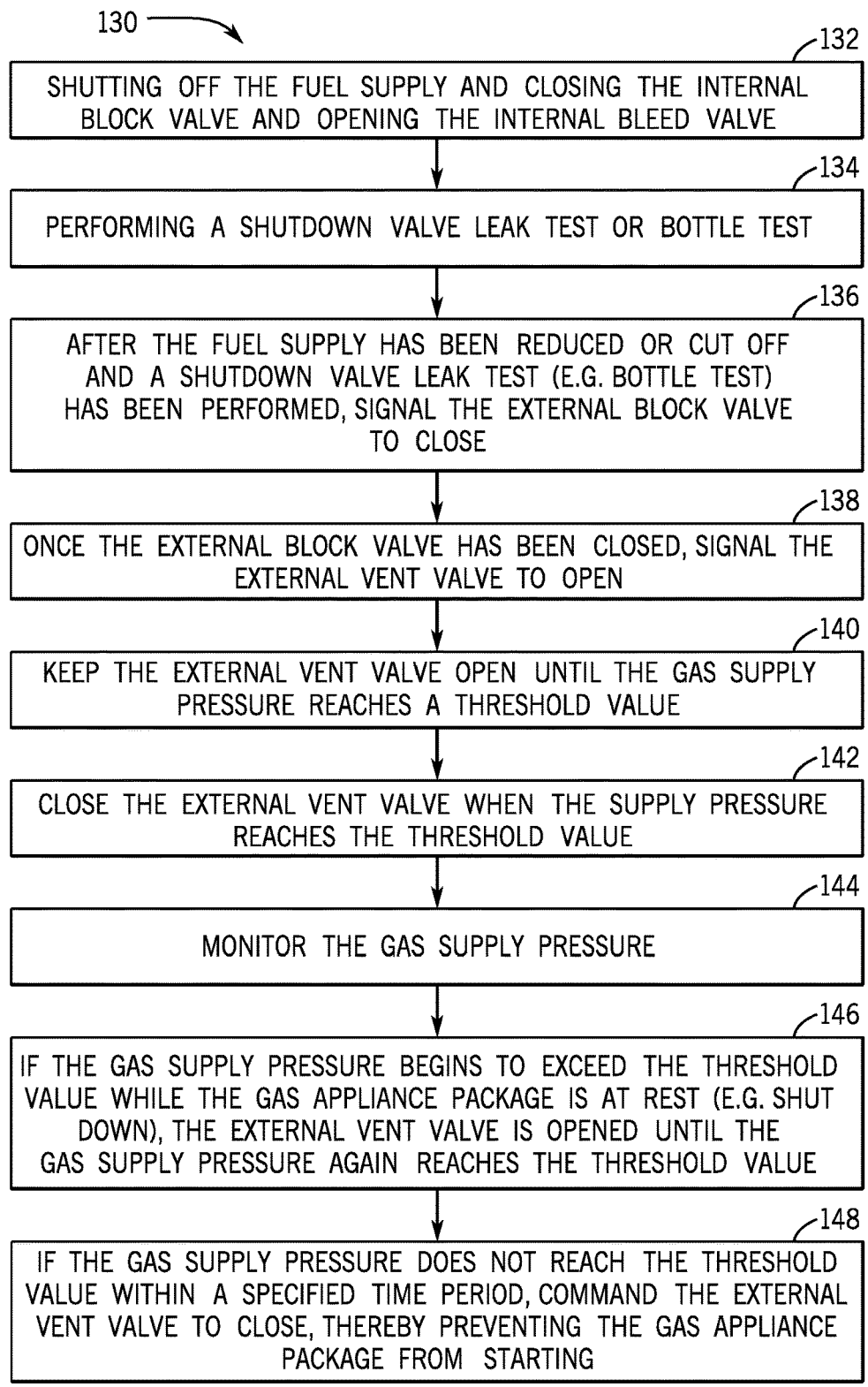
FIG. 5 depicts a method of controlling the valve skid assembly during normal shutdown.
Figure 6:
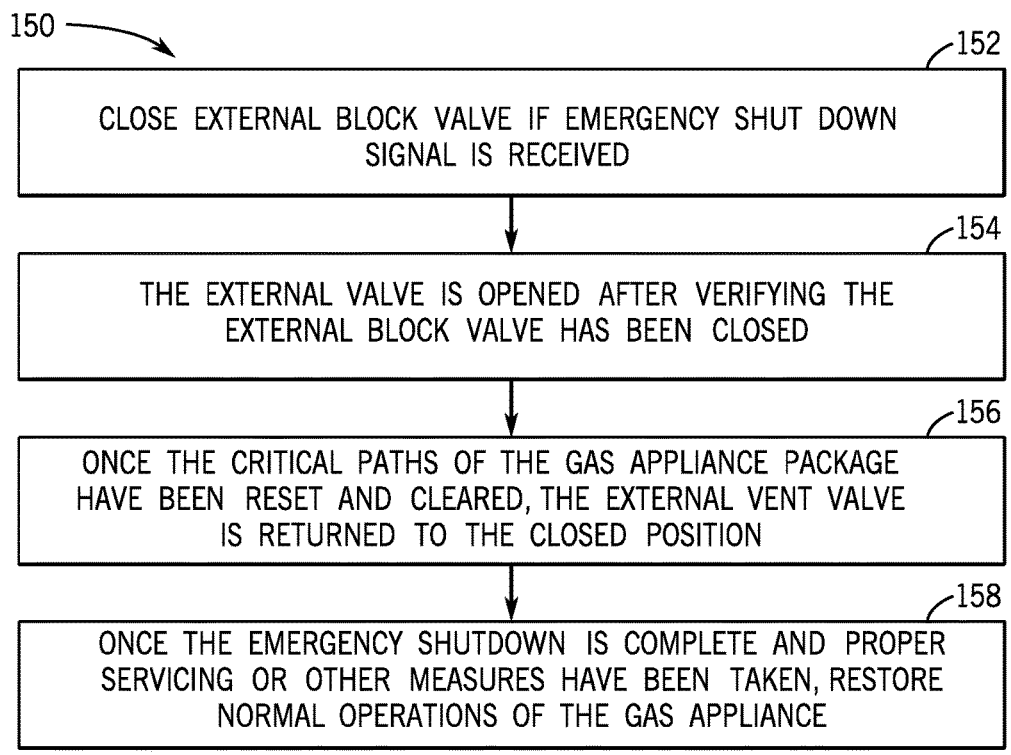
FIG. 6 depicts a method of controlling the valve skid assembly during emergency shutdown.

FIGS. 4-6 describe various controls logic associated (e.g., stored in memory 60) with various operating conditions (e.g., start up, shutdown, emergency shutdown) that the controller 56 may execute. It should be appreciated the control schemes described below are illustrative of the controls logic associated with the modular valve skid assembly 10 and are not intended to be limiting in any manner. FIG. 4 depicts a method 100 of controlling the valve skid assembly 10 during startup. Under startup conditions, the manual isolation valve is open and the block valve is closed while the bleed valve is open. The method 100 includes starting up the engine (block 102) and monitoring a flow the fluid flow for a minimum pressure requirement and pressure (block 104). Once a pressure transmitter receives a minimum (threshold), steady gas pressure, a purge of the turbine enclosure is initiated (block 106). During the purge of the turbine enclosure, an external valve leak test (e.g., bottle test) of the skid assembly is performed (block 108). Next, an internal valve leak test (e.g., bottle test) of the gas appliance package is performed (block 110). Upon completion of the internal and external valve leak tests, the combustion chamber of the gas appliance package is ignited (block 112), and the critical paths of the gas appliance package is monitored for any necessary emergency shutdown (block 114), as described further with respect to FIG. 6.

FIG. 5 depicts a method 130 of controlling the valve skid assembly 10 during normal shutdown. The method 130 includes shutting off the fuel supply and closing the block valve and opening the vent valve (block 132). The method 130 may include performing a shutdown valve leak test or bottle test (block 134). After the fuel supply has been reduced or cut off and a shutdown valve leak test (e.g., bottle test) has been performed, the controller 56 signals the external block valve to close (block 136). Once the external block valve has been closed, the controller 56 signals the external vent valve to open (block 138). The controller 56 keeps the external vent valve open until the gas supply pressure reaches a threshold value (block 140). The controller 56 then closes the external vent valve when the gas supply pressure reaches the threshold value (block 142). The controller 56 continues to monitor the gas supply pressure (block 144) via the pressure transducer 82. If the gas supply pressure begins to exceed the threshold value while the gas appliance package is at rest (e.g., shutdown or idle), the external vent valve is opened until the gas supply pressure again reaches the threshold value (block 146). If the gas supply pressure does not reach the threshold value within a specified time period, the controller 56 continuously commands the external vent valve to open, thereby preventing the gas appliance package from starting (block 148). If the gas supply pressure is greater than the threshold value, the external vent valve remains open and the gas appliance package does not start.

FIG. 6 depicts a method 150 of controlling the valve skid assembly 10 during emergency shutdown. If the controller 56 receives an emergency shutdown signal, the controller 56 commands the external block valve to close (block 152). The external valve is opened after verifying the external block valve has been closed (block 154). Once the critical paths of the gas appliance package have been reset and cleared, the external vent valve is returned to the closed position (block 156). Once the emergency shutdown is complete and proper servicing or other measures have been taken, the controller 56 may later restore normal operations of the gas appliance package (block 158) as described with respect to FIG. 4 (method 100).

By utilizing the methods of operation as described with respect to FIGS. 4-6 with the embodiments described in FIGS. 1-3, occurrence of emergency conditions is reduced. For example, by shutting down the gas appliance package as described, gas leaks, explosions, and other hazards may be reduced. Moreover, the embodiments described above with respect to FIGS. 1-3 may reduce the amount of down time necessary to service the components of the pre-assembled, modular valve skid assembly 10 and may reduce the amount of time the gas appliance package and the associated pre-assembled, modular valve skid assembly 10 are shutdown.

Technical effects of the disclosed embodiments include utilization of a pre-assembled modular skid assembly is described in detail below. The pre-assembled modular skid assembly is coupled to a fluid flow conduit (e.g., pipeline) on a first end and to a gas appliance package on a second end. The pre-assembled modular skid assembly includes at least a manual isolation valve, a shut off valve, and a bleed valve (e.g., vent valve). These valves may be utilized in the valve leak test (e.g., bottle test) to indicate whether or not there is fluid leaking from the flow conduit. As discussed in detail below, the embodiments of the pre-assembled modular valve skid assembly include several benefits related to the distance at which the pre-assembled, modular valve skid assembly is located from the gas appliance package.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
  a pre-assembled, modular valve assembly configured to be coupled to a fuel supply system for an industrial gas appliance and the industrial gas appliance, wherein the industrial gas appliance is selected from a plurality of different industrial gas appliances comprising at least two of a gas turbine engine, a diesel engine, or a combustion engine, and wherein the pre-assembled, modular valve assembly comprises:
    a manual isolation valve;
    a first block valve; and
    a bleed valve;
  wherein the modular valve assembly is configured to be disposed at a location external to the industrial gas appliance; and a controller communicatively coupled to the pre-assembled, modular valve assembly, where in the controller is configured to perform an external valve leak test of the pre-assembled, modular valve assembly, and an internal valve leak test of the industrial gas appliance.

2. The system of claim 1, wherein the modular valve assembly comprises a skid that supports the modular valve assembly.

3. The system of claim 1, wherein the modular valve assembly is configured to operate with different industrial gas appliances and to operate within a range of different operating pressures to enable operation with the different industrial gas appliances.

4. The system of claim 1, wherein the industrial gas appliance is configured to start upon completion of the external valve leak test and the internal valve leak test.

5. The system of claim 1, wherein modular valve assembly comprises a second block valve.

6. The system of claim 1, wherein the modular valve assembly comprises a manual bleed valve.

7. The system of claim 1, wherein the modular valve assembly is configured to be utilized in shutdowns operations of the industrial gas appliance.

8. The system of claim 1, wherein the modular valve assembly is configured to be utilized in startup operations of the industrial gas appliance.

9. The system of claim 1, wherein the modular valve assembly comprises a first pressure transducer configured to monitor a gas pressure for startup of the industrial gas appliance.

10. The system of claim 9, wherein the modular valve assembly comprises a second pressure transducer configured to be utilized in the external valve leak test.

11. The system of claim 1, comprising the gas turbine appliance, wherein the modular valve assembly is disposed approximately 1.5 to 6 meters from the industrial gas appliance.

12. The system of claim 1, wherein the industrial gas appliance comprises a generator, a gas turbine engine-generator package, or a combustion engine-gas generator package.

13. A system, comprising:
a universal skid assembly configured to be utilized with a plurality of different industrial gas appliances comprising at least two of a gas turbine engine, a diesel engine, or a combustion engine, and wherein the universal skid assembly comprises a modular valve assembly comprising:

a manual isolation valve;
a first block valve; and
a bleed valve; and
a controller communicatively coupled to the modular valve assembly, wherein the controller is configured to perform an external valve leak test of the modular valve assembly, and an internal valve leak test of one of the plurality of different industrial gas appliances.

14. The system of claim 13, wherein the universal skid assembly comprises a skid that supports the modular valve assembly.

15. The system of claim 13, wherein the universal skid assembly comprises a pressure transducer configured to be utilized in the internal valve leak test.

16. The system of claim 13, wherein the universal skid assembly is configured operate within a range of different operating pressures to enable operation with the different industrial gas appliances.

17. A system, comprising:
a skid assembly comprising a pre-assembled, modular valve assembly configured to be coupled to both a fuel supply system for an industrial gas appliance and the industrial gas appliance, wherein the industrial gas appliance is selected from a plurality of different industrial gas appliances comprising at least two of a gas turbine engine, a diesel engine, or a combustion engine, wherein the pre-assembled, modular valve assembly comprises:

a manual isolation valve;
a first block valve; and
a bleed valve;
wherein the modular valve assembly is configured operate within a range of different operating pressures to enable operation with different industrial gas appliances; and
a controller communicatively coupled to the modular valve assembly, wherein the controller is configured to perform an external valve leak test of the modular valve assembly, and an internal valve leak test of one of the plurality of different industrial gas appliances.

18. The system of claim 17, wherein the range of different operating pressures comprises 6.9 to 3,447 kPa.

19. The system of claim 17, wherein the range of different operating pressures comprises 3447 to 6,894 kPA.

20. The system of claim 17, wherein the range of different operating pressures comprises 6894 to 10,342 kPa.

* * * * *